United States Patent
Stafford et al.

(10) Patent No.: US 8,919,381 B2
(45) Date of Patent: Dec. 30, 2014

(54) VALVE BODY FLUID REROUTING SYSTEM

(75) Inventors: Maura J. Stafford, Warner Robins, GA (US); Robert C. Warnke, Spooner, WI (US)

(73) Assignee: Sonnax Industries, Inc., Bellows Falls, VT (US)

( * ) Notice: Subject to any disclaimer, the term of this patent is extended or adjusted under 35 U.S.C. 154(b) by 358 days.

(21) Appl. No.: 13/443,386

(22) Filed: Apr. 10, 2012

(65) Prior Publication Data

US 2013/0098465 A1   Apr. 25, 2013

Related U.S. Application Data (63) Continuation-in-part of application No. 12/397,033, filed on Mar. 3, 2009, now abandoned.

(51) Int. Cl.
| | | |
|---|---|---|
| F15B 13/04 | (2006.01) | |
| F16K 17/00 | (2006.01) | |
| F16H 61/00 | (2006.01) | |
| F16H 61/02 | (2006.01) | |
| F16K 39/04 | (2006.01) | |
| F16K 11/07 | (2006.01) | |

(52) U.S. Cl.
CPC ............ *F16K 17/00* (2013.01); *F16H 61/0009* (2013.01); *F16H 61/0276* (2013.01); *F16K 39/04* (2013.01); *F16K 11/07* (2013.01); *F16K 11/0716* (2013.01); *F16H 2061/0253* (2013.01)
USPC .................................. 137/625.68; 137/625.69

(58) Field of Classification Search
USPC .............. 137/625.65–625.66, 625.68–625.69
See application file for complete search history.

(56) References Cited

U.S. PATENT DOCUMENTS

| | | | |
|---|---|---|---|
| 3,176,721 A | 4/1965 | Gordon | |
| 3,186,424 A | 6/1965 | Peach | |
| 3,825,028 A | 7/1974 | Hermann | |
| 4,084,618 A * | 4/1978 | Gurries | 137/625.48 |
| 5,247,965 A | 9/1993 | Oka et al. | |
| 5,259,414 A * | 11/1993 | Suzuki | 137/625.65 |

(Continued)

FOREIGN PATENT DOCUMENTS

WO   2010101871   9/2010

OTHER PUBLICATIONS

International Search Report and Written Opinion dated May 4, 2010 in related International Application No. PCT/US10/25854 entitled "Valve Body Fluid Rerouting System."

(Continued)

*Primary Examiner* — John Fox
(74) *Attorney, Agent, or Firm* — Downs Rachlin Martin PLLC (57) ABSTRACT

There is provided a fluid rerouting system for valve bodies that use hydraulic pressure, via a balance pressure line, to move spools. In an exemplary embodiment, the system comprises a valve sleeve having a plurality of ports that are substantially aligned with a plurality of fluid connections in the mating bore, except that no valve sleeve port aligns with the balance pressure line. The system also includes a spool having a plurality of lands that are sized and configured to fit slidably in said valve sleeve. The combination of the valve sleeve and at least one of the lands form a chamber, fluid access to which is via an aperture traversing the land. Means for blocking the access of said balance pressure line to said valve sleeve are also included.

26 Claims, 5 Drawing Sheets

(56) References Cited

U.S. PATENT DOCUMENTS

| | | |
|---|---|---|
| 6,199,823 B1 | 3/2001 | Dahlgren et al. |
| 6,408,883 B2 * | 6/2002 | Motoki et al. ........... 137/625.64 |
| 6,634,377 B1 | 10/2003 | Stafford |
| 6,990,996 B2 | 1/2006 | Stafford |
| 2002/0179158 A1 | 12/2002 | Warnke |
| 2003/0181277 A1 | 9/2003 | Younger |
| 2004/0140443 A1 | 7/2004 | Miyata et al. |
| 2005/0005971 A1 | 1/2005 | Stafford |
| 2005/0272549 A1 | 12/2005 | Carne |
| 2007/0135253 A1 | 6/2007 | Kondoh et al. |
| 2010/0224803 A1 | 9/2010 | Stafford et al. |

OTHER PUBLICATIONS

Related U.S. Appl. No. 12/397,033, filed Mar. 3, 2009, in the name of Maura Jane Stafford et al., entitled "Valve Body Fluid Rerouting System."

Notice of Allowance dated Jan. 11, 2012, in related U.S. Appl. No. 12/397,033, filed Mar. 3, 2009, in the name of Maura Jane Stafford et al., entitled "Valve Body Fluid Rerouting System."

* cited by examiner

VALVE BODY FLUID REROUTING SYSTEM

RELATED APPLICATION DATA

This application is a continuation-in-part of U.S. patent application Ser. No. 12/397,033, filed Mar. 3, 2009, and titled "Valve Body Fluid Rerouting System," which is incorporated by reference herein in its entirety.

FIELD OF THE INVENTION

The present invention generally relates to the field of valve assemblies. In particular, the present invention is directed to a valve body fluid rerouting system.

BACKGROUND

Transmissions and other types of valve bodies typically contain several valve assemblies that move in response to hydraulic pressure. In an automobile transmission, for example, numerous valve assemblies may be in fluid communication with one another, with each valve assembly independently oscillating in response to hydraulic pressure changes occurring in the transmission. While there are many different types of valve assemblies, a typical valve assembly includes a spool, a spring, a plug, and a retaining pin. These valve assemblies reside inside a mating bore, a hole in the valve body that is sized for the corresponding valve assembly.

Figure 1A:
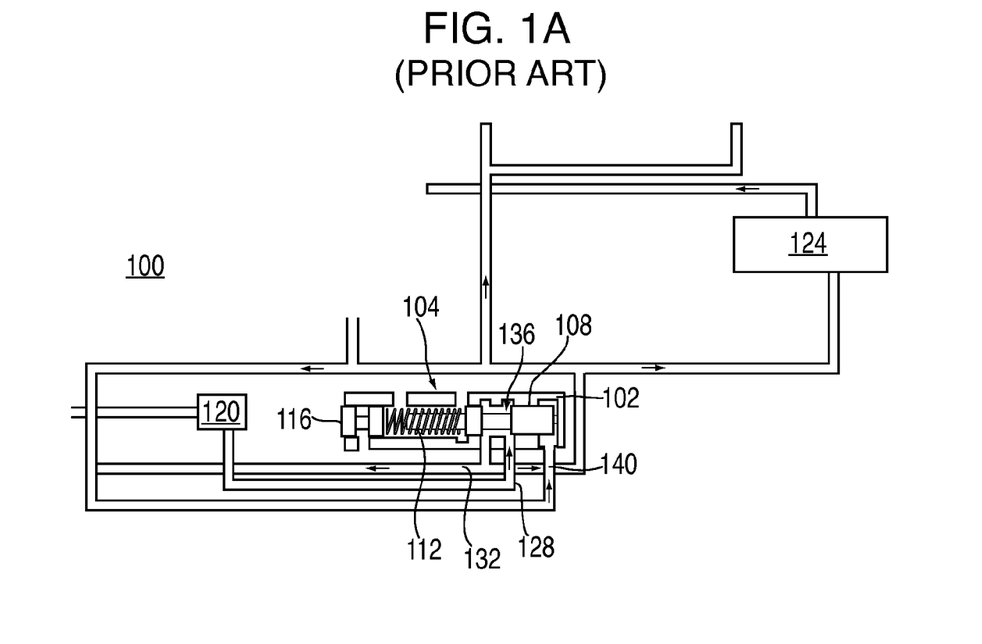
FIG. 1A is a schematic diagram of a prior art fluid circuit for a valve body containing a valve assembly in the substantially open position.
Figure 1B:
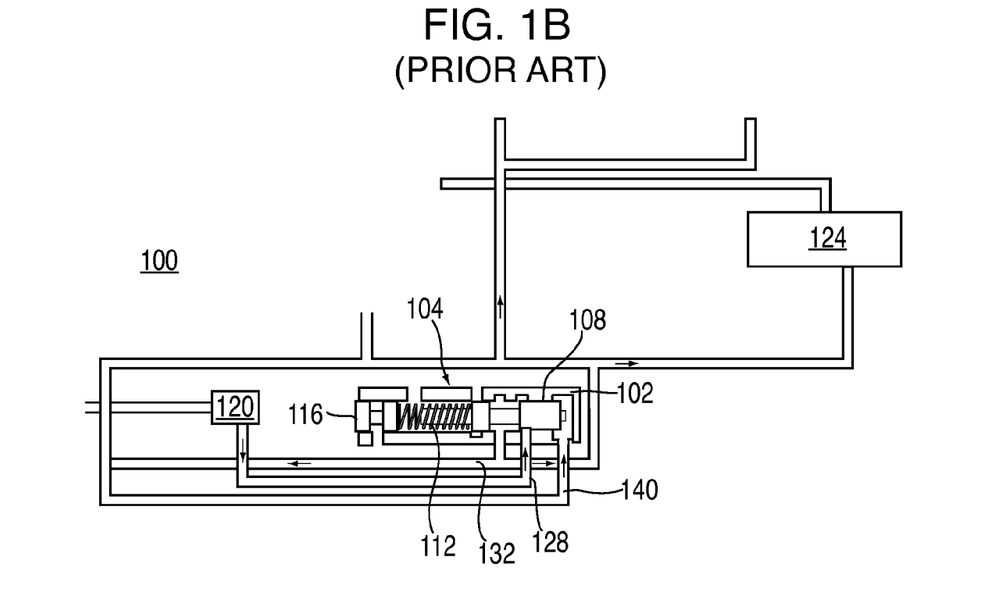
FIG. 1B is a schematic diagram of a prior art fluid circuit for a valve body containing a valve assembly in the substantially closed position.

FIGS. 1A and 1B are schematic diagrams of typical prior art hydraulic circuits. Valve body 100 contains a fluid circuit that includes a valve assembly 104, which includes a spool 108, a spring 112, and a plug 116. Valve assembly 104 communicates with other components in the fluid circuit, such as fluid strainer 120 and receiving valve assembly 124, via a first fluid line 128 and a second fluid line 132.

FIG. 1A shows valve assembly 104 in the substantially open position inside mating bore 102. While in the open position, first fluid line 128 delivers fluid to a chamber 136, which then exits to second fluid line 132. Fluid leaving chamber 136 flows to receiving valve assembly 124 and to a balance pressure line 140. As shown in FIG. 1A, balance pressure line 140 is at least partially blocked by spool 108. In operation, as hydraulic pressure builds in second fluid line 132 (a result of diminished fluid exiting the receiving valve assembly 124 and continuing accumulation of fluid from first fluid line 128), fluid enters behind spool 108 via balance pressure line 140. As fluid accumulates behind spool 108, spool 108 moves against spring 112 to the substantially closed position shown in FIG. 1B.

While in the substantially closed position, the hydraulic pressure in second fluid line 132 decreases as fluid exits receiving valve assembly 124. As the hydraulic pressure decreases, spring 112 moves spool 108 into the substantially open position, thus restoring access to chamber 136 by first fluid line 128.

As the valve moves back and forth in response to changes in hydraulic pressure, the spool lands brush against the mating bore. The repeated oscillations wear down the spool lands, the mating bore, or both. The wear allows fluid that would otherwise be contained in a valve chambers to spread into the worn area between the spool land and the mating bore. In cases where the wear is sufficient, the fluid may move from one valve chamber to another, effectively reducing the ability of the valve to effectively control fluid communications, thus disrupting fluid control in the valve body.

Repairing a worn mating bore and valve assembly is both time consuming and costly. Typically, the mating bore must be reamed to a larger size and a new, larger valve assembly is inserted. While this operation will correct the problem, the tooling required to ream the mating bore is expensive and the repair is labor intensive.

SUMMARY OF THE DISCLOSURE

The present disclosure describes a system, apparatus and method for rerouting fluid communications in a valve body. In an exemplary embodiment of the present invention, a valve body fluid rerouting system is described that limits access to a mating bore by a balance pressure line and provides a means by which a spool will oscillate in response to hydraulic pressure in the valve body without the use of the balance pressure line via the existing balance pressure line port.

In a preferred embodiment, a valve sleeve, having a plurality of ports, is sized and configured to fit slidably inside a mating bore. The ports of the valve sleeve correspond to fluid communication ports inside the mating bore, except that the valve sleeve does not have a port that corresponds to a balance pressure line. A spool, having a plurality of lands, is sized and configured to fit slidably inside the valve sleeve. The lands, in combination with the valve sleeve, create at least one chamber in the location where the balance pressure line would previously input fluids. Fluid access to this chamber is by an aperture in the spool, which thereby provides the hydraulic pressure for opening and closing of the valve. A balance pressure orifice is also blocked in order to prevent fluid from entering between the valve sleeve and the mating bore.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 2:
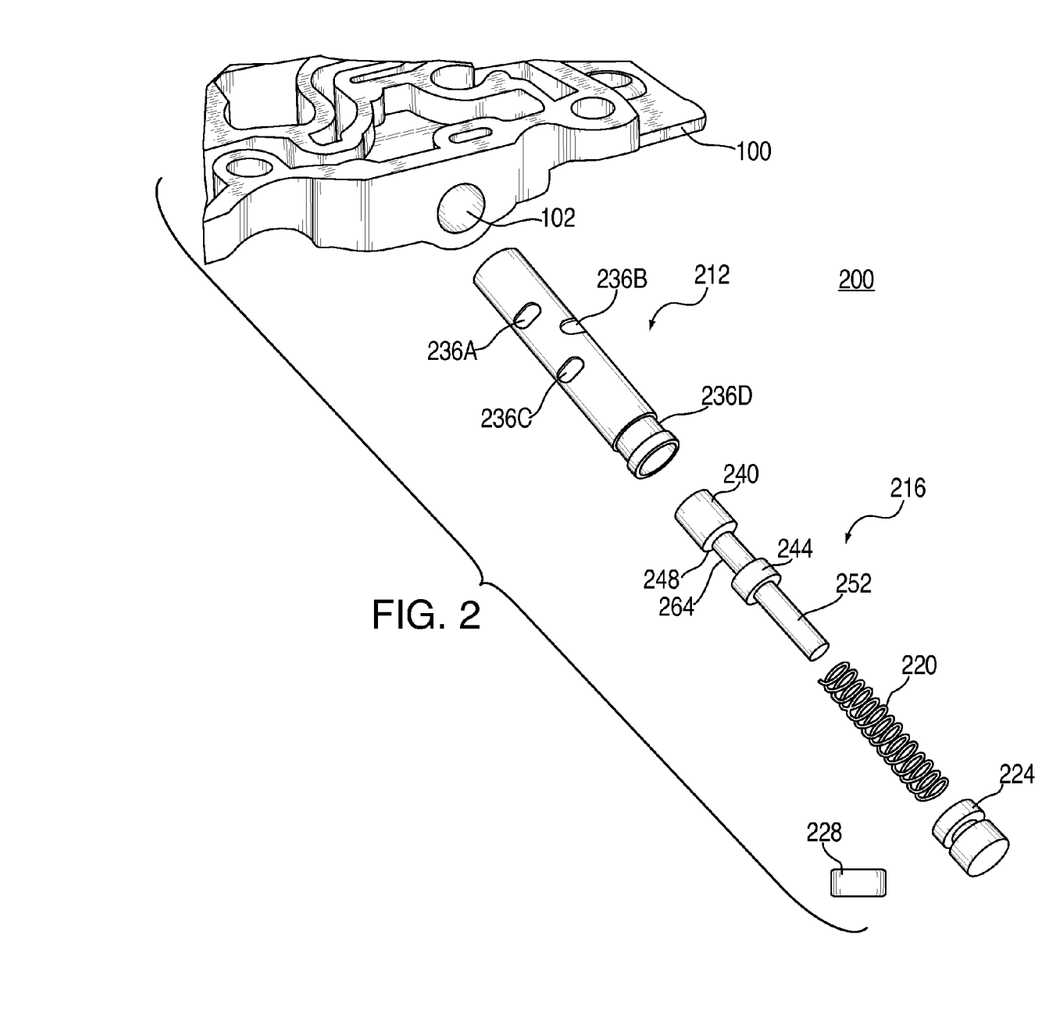
FIG. 2 is a perspective, exploded view of an exemplary fluid rerouting valve assembly outside of a mating bore according to an embodiment of the present invention.

Referring now to the drawings, FIG. 2 illustrates an example of a valve body fluid rerouting system 200 in accordance with an exemplary embodiment of the present invention. Generally, valve body fluid rerouting system 200 is suitable for replacing a pre-existing valve assembly in an existing valve body 100 when mating bore 102 or valve spool 108 has worn. As will be discussed more fully below, valve body fluid rerouting system 200 reroutes fluid communication paths in valve body 100 so that the valve assembly can be replaced and properly function without the need for reaming or other special machining of valve body 100.

Valve body fluid rerouting system 200 is suited for, but not limited to, being a replacement for a solenoid modulator valve in an automobile transmission. Exemplary transmissions include Aisin Warner and Nissan transmissions AW55-50SN, AW55-51SM, AF 23/33, or RE5F22A, but persons of ordinary skill in the art will readily identify other suitable applications based on the teachings of the present disclosure.

Figure 3A:
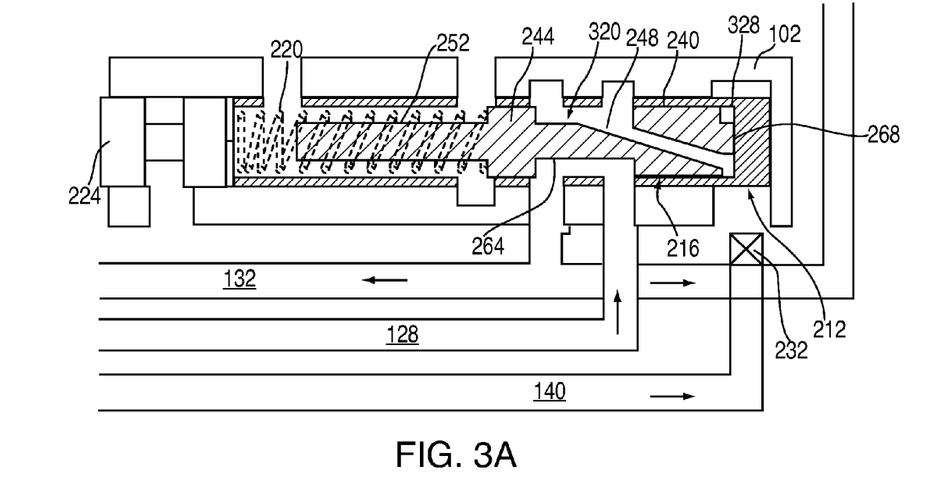
FIG. 3A is a schematic fluid circuit diagram of a valve body containing an exemplary valve body fluid rerouting system in the substantially open position according to an embodiment of the present invention.
Figure 3B:
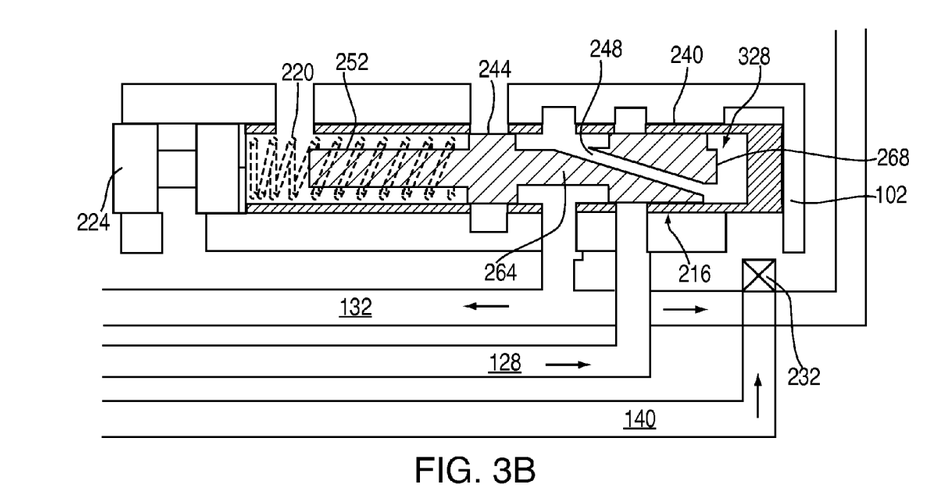
FIG. 3B is a schematic fluid circuit diagram of a valve body containing an exemplary valve body fluid rerouting system in the substantially closed position according to an embodiment of the present invention.

As valve body fluid rerouting system 200 is intended to be a direct replacement for an existing valve assembly with a worn spool 108 or in a worn bore 102, embodiments of the present invention are described herein in connection with the prior art valve body 100 and its fluid circuit as shown in FIGS. 1A and 1B. Details of an exemplary embodiment of the present invention are shown in FIGS. 2-4.

Figure 4:
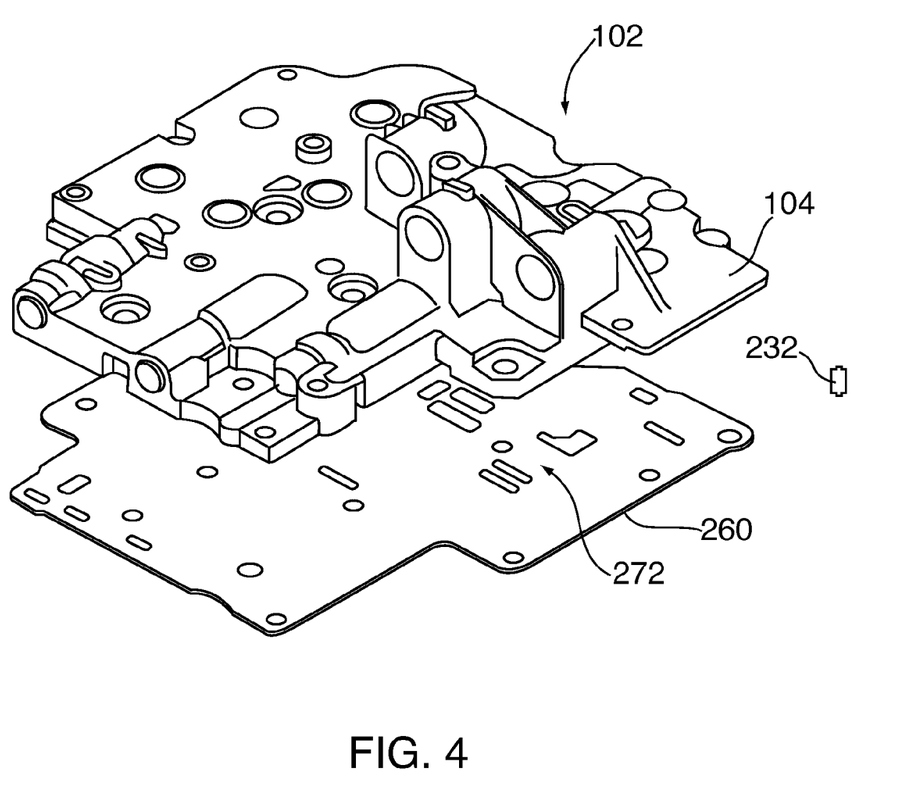
FIG. 4 is a perspective view of a valve body with a separator plate and a separator plate plug according to an embodiment of the present invention.

Referring first to FIG. 2, a valve body fluid rerouting system 200 according to an exemplary embodiment includes a valve sleeve 212, a spool 216, a biasing member 220, a bore plug 224, a retaining pin 228, and a separator plate plug 232 (shown on FIG. 4). Valve sleeve 212 is generally sized and configured to fit slidably into mating bore 102 (via, for example, a slight press or slight slip fit) and has a plurality of ports 236 corresponding to communication ports inside valve body 100, such as fluid input, fluid outlet, and exhaust ports. In an exemplary embodiment, valve sleeve 212 has four ports, i.e., 236A-D, that correspond to a first fluid line 128, a second fluid line 132, and exhaust points.

Figure 5:
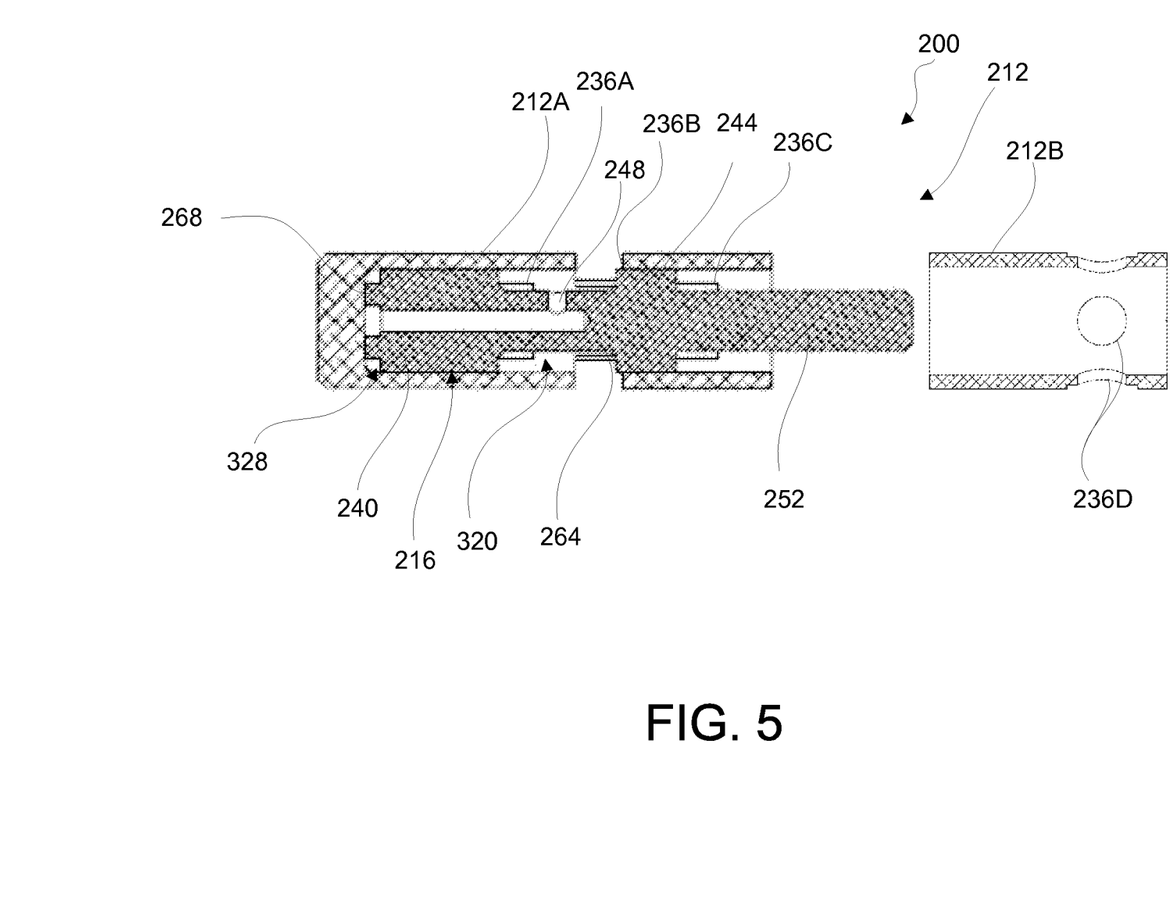
FIG. 5 is a cross-sectional view of a split-sleeve embodiment of the present invention.

Spool 216 may have a plurality of coaxial lands. In an exemplary embodiment, spool 216 has a first land 240 and a second land 244 that are sized and configured to fit slidably in valve sleeve 212. Spool 216 may also have an aperture 248 extends through first land 240 either diagonally or via a linear pathway (as seen in FIGS. 3 and 5, respectively).

Biasing member 220 is generally chosen to resist axial movement of spool 216 toward bore plug 224. In an exemplary embodiment, biasing member 220 is a compression spring sized and configured to fit into valve sleeve 212 and around a distal post 252 of spool 216. Bore plug 224 is generally sized and configured to fit slidably in mating bore 102 after valve sleeve 212, spool 216 and biasing member 220 are placed into mating bore 102. Bore plug 224 is generally held in place via retaining pin 228. In an alternative embodiment, bore plug 224 may be sized and dimensioned to slide into valve sleeve 212 so long as a secure hydraulic seal is maintained inside valve sleeve 212.

Valve sleeve 212 (or second valve sleeve portion 212B, as discuss more below) is designed and configured, so that when inserted into mating bore 102, it substantially blocks balance pressure line 140 from delivering fluid between the valve sleeve and the mating bore. In alternative embodiments, valve body fluid rerouting system 200 may additionally include separator plate plug 232. In an exemplary embodiment, separator plate plug substantially blocks balance pressure line 140 (best seen in FIG. 3A) access to valve sleeve 212. In a preferred embodiment, separator plate plug 232 is inserted into balance pressure orifice 272 (as shown on FIG. 4) in separator plate 260 and the separator plate plug is peened over on both sides.

The present disclosure is best understood by describing the movement of a fluid in valve body 100 using valve body fluid rerouting system 200. FIG. 3A-B illustrates an exemplary fluid circuit containing valve body fluid rerouting system 200 and other components of a typical valve body that may include, but are not limited to, a fluid strainer 120 and a receiving valve assembly 124 as previously described.

In an exemplary embodiment and as shown in FIG. 3A, when spool 216 is in the substantially open position, first fluid line 128 may deliver fluid to a first chamber 320, which is formed between first land 240 and second land 244 and enclosed by valve sleeve 212. Fluid in first chamber 320 exits to second fluid line 132 and may thereafter be routed to either receiving valve assembly 124 or to balance pressure line 140. Notably, in valve body fluid rerouting system 200 balance pressure line 140 is substantially blocked. Thus, fluid is prevented from accessing the rear of spool 216 via balance pressure line 140.

As the hydraulic pressure in second fluid line 132 increases, fluid may fill a second chamber 328 located behind spool 216 through aperture 248, the second chamber being formed by the intersection of the top of first land 240 and valve sleeve 212. As fluid fills second chamber 328, fluid pressure may react against the top of first land 240, thus expanding second chamber 328 and moving spool 216 against biasing member 220.

When sufficient hydraulic pressure has accumulated in second fluid line 132, spool 216 generally moves to a substantially closed position as shown in FIG. 3B. In a substantially closed position, first land 240 substantially blocks first fluid line 128. As hydraulic pressure in second fluid line 132 decreases, e.g., fluid moves through receiving valve assembly 124, fluid travels from second chamber 328 to first chamber 320 through aperture 248. As fluid moves out of second chamber 328, biasing member 220 moves spool 216 to a substantially open position, thus restoring fluid communication between first fluid line 128 and second fluid line 132.

Valve sleeve 212 and spool 216 may be constructed of a variety of metals known in the art. Exemplary metals include, but are not limited to, carbon steels, alloy steels, stainless steels, aluminum, and aluminum alloys, among others. Materials may be selected based on one or more desirable physical properties, e.g., strength, hardness, durability, malleability, machinability, coefficient of thermal expansion, and/or drilling characteristics. The materials will typically be selected to cooperate with each other. In one embodiment, valve sleeve 212 is made of steel, which would typically, but not necessarily, result in carburized steel material chosen for spool 216. In another embodiment, valve sleeve 212 is made of 4032 aluminum, which would typically, but not necessarily, result in hard-coat anodized aluminum material chosen for spool 216. In an exemplary embodiment, valve sleeve 212 is constructed of hardened carbon steel that has a Rockwell Superficial Hardness 15N-Scale (HR15N) range of 74-77 (Rockwell Hardness C-Scale (HRC) range of 28-34) while spool 212 is made of low carbon steel that has been carburized such that it has a HR 15N range of 89-92 (HRC 58-62). In an alternative embodiment, valve sleeve 212 is constructed of hardened carbon steel that has HR 15N range of 70-77 (HRC range of 20-34).

Valve sleeve 212 may have different constructions including, for example, a continuous body or an assembly of separate members that are sized and configured to conform to mating bore 102 and to receive spool 216. A construction consistent with a continuous body, for instance, may consist of valve sleeve 212 having a continuous cylindrical body and providing ports 236, such as the continuous valve sleeve body shown in FIG. 2. A construction consistent with an assembly of separate members, for instance, may include two or more cylindrical sections that combine to perform the function of the valve sleeve and to provide ports 236.

In an exemplary embodiment of an assembly of separate members, and as shown in FIG. 5, valve sleeve 212 is divided into two portions, i.e. first sleeve portion 212A and second sleeve portion 212B. First sleeve portion 212A includes three ports 236, i.e., 236A-C. The length of first sleeve portion 212A is such that it extends past second land 244 (i.e., to the right of second land 244, as illustrated in FIG. 5). Second sleeve portion 212B includes port 236D and has a length that complements the length of first sleeve portion 212A so as to provide a sleeve 212 with an overall length suitable for insertion into mating bore 102 and for receiving biasing member 220 and bore plug 224.

While valve sleeve 212 as described in an exemplary embodiment is generally cylindrical, it is understood that valve sleeve 212 can take on any number of shapes known in the art. Valve sleeve 212 may be made in the image of a member of the prisamatoid family, including parallelograms, cuboids, etc. As a person skilled in the art will readily identify, the shape and size of valve sleeve 212 will generally correspond to the size and shape of mating bore 102 such that valve sleeve 212 will fit slidably into mating bore 102 and, in addition, so that valve spool 216 will fit slidably into valve sleeve 212.

Spool 216 will generally take on a shape that corresponds to fit slidably in valve sleeve 212. In an exemplary embodiment, spool 216 is generally cylindrical, but as a person skilled in the art will readily identify spool 216 can take on any number of shapes known in the art. Spool may have a distal knob 268 (best seen in FIG. 3B) on first land 240 to prevent hydraulic locking. One skilled in the art would understand that other arrangements may prevent hydraulic locking of spool 216 in valve sleeve 212 including, but not limited to, a flange coupled to the top of first land 240 or a flange coupled to the inside of valve sleeve 212.

First land 240 and second land 244 may be coupled via connector 264. In one example, connector 264 is generally cylindrical body that is coaxial to first land 240 and second land 244. As a person skilled in the art will readily identify, connector 264, in addition to coupling together multiple lands, may also serve to create the space necessary for first chamber 320. Thus, a person skilled in the art will easily recognize that connecter 264 may take on many shapes known in the art that would suffice to connect first land 240 to second land 244 such as cylinders, cuboids, parallelepipeds, or other members of the prisamatoid family, e.g., multi-sided parallelograms, pyramids, and frusta, which couple multiple lands and provide space for first chamber 320.

Aperture 248 may extend from the top surface of first land 240 to connector 264. In an exemplary embodiment, aperture 248 is generally cylindrical, forming an angle of approximately twenty degrees with the axial position of spool 216. In this embodiment, aperture 248 begins at the top of first land 240, which is located proximate distal knob 268, and continues an exit in the side wall of connector 264. In an alternative embodiment, aperture 248 may run collinear to the longitudinal axis of spool 216, i.e., from the top surface of first land 240 to the bottom surface of the first land, if connector 264 is of sufficiently small size to allow adequate exit on the bottom surface of the first land. Alternatively, the portion of aperture 248 within first land 240 may run substantially collinearly to the longitudinal axis of spool 216 and then may turn to extend transversely, e.g., perpendicularly in one embodiment, to the longitudinal axis of the spool and then exit at the sidewall (i.e., the radially outermost surface) of connector 264. Aperture 248 may also traverse distal knob 268 in addition to first land 240.

Second land 244 may have a retaining element such as distal post 252 coupled to its bottom surface. In one example, distal post 252 is generally of such length so as to not come into contact with a bore plug 224 when spool 216 is in a substantially closed position (not shown) and to support biasing member 220. In an exemplary embodiment, distal post 252 has an altitude that is at least fifty-five percent of length of biasing member 220.

Biasing member 220 may have an ability to resist axial movement of spool 216 until the pressure in second fluid line 132 of valve body 100 reaches a certain amount. In an exemplary embodiment, biasing member 220 is a compression spring that has an outside diameter of approximately 0.250 inches, an uncompressed length of approximately 1.073 inches, and a spring constant of approximately 15.88 lbs./in. Although in a preferred embodiment biasing member 220 is a compression spring, other means are known in the art may be used to oppose the axial movement of spool 216, such as hydraulic or electric resistance devices.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A fluid rerouting system for a valve body having a mating bore with a plurality of fluid connections and a balance pressure line, the system comprising:
   a valve sleeve having a first end and a second end and configured and dimensioned to be inserted in the mating bore and defining a plurality of ports disposed to be substantially aligned with the plurality of fluid connections when said valve sleeve is inserted, wherein said first end aligns with the balance pressure line;
   a valve spool configured and dimensioned to fit slidably in said valve sleeve and having a plurality of lands configured for routing fluid between said plurality of ports, wherein at least one of said plurality of lands and said valve sleeve form a chamber, said valve spool being configured for selective movement between at least first and second positions within said sleeve;
   an aperture traversing said at least one of said plurality of lands so that fluid may enter said chamber; and
   means for blocking the balance pressure line in the valve body to prevent communication with said valve sleeve.

2. The system according to claim 1, wherein said plurality of lands comprises:
   a first land sized and configured to move slidably in said valve sleeve; and
   a second land sized and configured to move slidably in said valve sleeve,
   wherein a second chamber is formed between said first land, said second land, and said valve sleeve, said second chamber fluidly connected to said chamber by said aperture.

3. The system according to claim 2, further comprising a biasing member acting on said valve spool to restore said valve spool from the second position to the first position.

4. The system according to claim 1, wherein said means for blocking access comprises a separator plate plug.

5. The system according to claim 1, further comprising a plug closing said second end of said valve sleeve.

6. The system according to claim 1, wherein said system includes a means to prevent hydraulic locking of said valve spool inside said valve sleeve.

7. The system according to claim 6, wherein said means to prevent hydraulic locking is a distal knob disposed on an end of said valve spool.

8. The system according to claim 7, wherein said aperture traverses, in part, said distal knob.

9. The system according to claim 1, wherein said valve sleeve is a multi-part assembly.

10. The system according to claim 9, wherein said valve sleeve has a first valve sleeve portion and a second valve sleeve portion, said first valve sleeve portion being separate and distinct from said second valve sleeve portion.

11. A valve assembly for installation in a valve body having a mating bore that includes plural fluid lines and a balance pressure line opening into the mating bore, the valve assembly comprising:
a valve sleeve configured and dimensioned to be slidably received in the mating bore covering the balance pressure line opening, said valve sleeve including plural fluid ports disposed to communicate with the valve body fluid lines;
a valve spool disposed with said valve sleeve and including at least one land having a top surface and a bottom surface, the valve spool and valve sleeve together defining first and second fluid chambers separated by said at least one land wherein the bottom of said at least one land is contiguous said first chamber and the top surface of said at least one land is contiguous said second chamber;
an aperture defined by said valve spool fluidly connecting said first chamber and said second chamber;
a bore plug sealing said valve sleeve in the mating bore; and
a biasing member acting between said valve sleeve and said valve spool.

12. The valve assembly according to claim 11, including in combination a separator plate plug configured and dimensioned to block fluid from the balance pressure line from entering between said valve sleeve and the mating bore.

13. The valve assembly according to claim 12, wherein said valve sleeve is a multi-part assembly.

14. The valve assembly according to claim 13, wherein said valve sleeve has a first valve sleeve portion and a second valve sleeve portion, said first valve sleeve portion being separate and distinct from said second valve sleeve portion.

15. The valve assembly according to claim 11, wherein said aperture extends diagonally from said first chamber to said second chamber.

16. The valve assembly according to claim 11, wherein said valve spool further includes a connector with a sidewall coupled to said bottom surface of said first land, wherein said first land has a length, and wherein said aperture extends in substantially collinear relation to a longitudinal axis of said valve spool within said first land and then extends transversely to the longitudinal axis and exits said sidewall of said connector.

17. A valve assembly for a valve body having a plurality of fluid lines comprising:
a multi-part valve sleeve assembly including at least first and second valve sleeve portions, wherein at least one of said first and second valve sleeve portions includes at least one fluid port, said first and second valve sleeve portions being configured to be arranged within the valve body so as to communicate with the plurality of valve body fluid lines;
a valve spool disposed within said multi-part valve sleeve assembly and including at least one land having a top surface and a bottom surface, said valve spool and said first valve sleeve portion together defining first and second fluid chambers separated by said at least one land, wherein said bottom surface of said at least one land is contiguous said first chamber and said top surface of said at least one land is contiguous said second chamber; and
an aperture defined by said valve spool fluidly connecting said first chamber and said second chamber, said second chamber being a closed chamber so that, during use, the only path of fluid egress from said second chamber is through said aperture.

18. The valve assembly according to claim 17, wherein said aperture extends diagonally from said first chamber to said second chamber.

19. The valve assembly according to claim 17, wherein said valve spool further includes a connector with a sidewall coupled to said bottom surface of said first land, wherein said first land has a length, and wherein said aperture extends in substantially collinear relation to a longitudinal axis of said valve spool within said first land and then extends transversely to the longitudinal axis and then exits said sidewall of said connector.

20. The valve assembly according to claim 17, wherein said valve spool further includes a distal knob and wherein said aperture travels through said distal knob.

21. The valve assembly according to claim 17, further including a separator plate plug configured and dimensioned to block fluid from one of said plurality of valve body fluid lines from entering between said valve sleeve and a mating bore of the valve body.

22. A method for rerouting balance pressure in a worn mating bore having plural fluid connections and a balance pressure line, said method comprising:
positioning at least a portion of a hollow valve sleeve in the worn mating bore, said portion of a hollow valve sleeve having plural ports, each communicating with a respective one of the mating bore fluid connections;
inserting a valve spool into said portion of a hollow valve sleeve, said valve spool having a plurality of concentric lands that create a plurality of chambers inside said portion of a hollow valve sleeve, said valve spool containing an aperture that connects at least two of said plurality of chambers; and
preventing fluid from the balance pressure line from entering said valve sleeve.

23. The method for rerouting balance pressure according to claim 22, wherein said preventing step comprises blocking the balance pressure line.

24. The method for rerouting balance pressure according to claim 23, wherein said blocking comprises:
inserting a plug in said balance supply orifice; and
peening said plug to lodge said plug in said balance supply orifice.

25. The method for rerouting balance pressure according to claim 22, wherein the hollow valve sleeve and valve spool are positioned together in the mating bore as an assembly including a biasing element acting between said hollow valve sleeve and said valve spool.

26. The method according to claim 22, wherein said positioning step includes positioning the hollow valve sleeve in one part of a sleeve assembly having two separate and distinct parts.

* * * * *